(12) United States Patent
Chen et al.

(10) Patent No.: US 7,477,626 B2
(45) Date of Patent: Jan. 13, 2009

(54) APPARATUS OF DYNAMICALLY ASSIGNING EXTERNAL HOME AGENT FOR MOBILE VIRTUAL PRIVATE NETWORKS AND METHOD FOR THE SAME

(75) Inventors: Jyh-Cheng Chen, Hsin-Chu (TW); Li-Wei Lin, Hsin-Chu (TW); Yi-Wen Liu, Hsin-Chu (TW)

(73) Assignee: Zyxel Communications Corporation, Hsin-Chu (TW)

( * ) Notice: Subject to any disclaimer, the term of this patent is extended or adjusted under 35 U.S.C. 154(b) by 489 days.

(21) Appl. No.: 10/948,150

(22) Filed: Sep. 24, 2004

(65) Prior Publication Data

US 2006/0067265 A1 Mar. 30, 2006

(51) Int. Cl.
*H04Q 7/00* (2006.01)
(52) U.S. Cl. .................... 370/331; 455/432.1; 455/433; 455/436; 455/440
(58) Field of Classification Search ................ 370/331; 380/258, 270; 713/153, 154; 455/432.1, 455/433, 436, 440
See application file for complete search history.

(56) References Cited

U.S. PATENT DOCUMENTS 7,174,018 B1 * 2/2007 Patil et al. .................... 380/258

2003/0217145 A1 * 11/2003 Leung et al. ................. 709/224
2005/0111380 A1 * 5/2005 Adrangi et al. ............. 370/254

FOREIGN PATENT DOCUMENTS

EP 1075123 A1 * 2/2001

OTHER PUBLICATIONS

Chen, Yu, Dynamic Home Agent Reassignment in Mobile IP, 2002, IEEE, http://ieeexplore.ieee.org/iel5/7793/21425/00993460.pdf, pp. 44-48.*

* cited by examiner

*Primary Examiner*—Duc Nguyen
*Assistant Examiner*—Wayne Cai

(57) ABSTRACT

An apparatus dynamically assigns external home agent (HA) for VPNs and a method for the same is proposed. The apparatus establishes VPN between an internal network and at least one external network, whereby a mobile node (MN) can roam in the external network with security. The external HA closest to the MN in the visited external network is selected for mobility management of the MN. The MN only needs to register with the same external HA when roaming in the same external network. The handoff latency and end-to-end latency for a roaming MN, therefore, could be reduced significantly. It will also not reestablish the IPsec tunnel within the same external network.

11 Claims, 8 Drawing Sheets

APPARATUS OF DYNAMICALLY ASSIGNING EXTERNAL HOME AGENT FOR MOBILE VIRTUAL PRIVATE NETWORKS AND METHOD FOR THE SAME

BACKGROUND OF THE INVENTION

1. Field of the Invention

The present invention relates to an apparatus of dynamically assigning external home agent (x-HA) for mobile virtual private networks (VPNs) and method for the same; especially to an apparatus of dynamically assigning x-HA for IPsec-based mobile VPNs and method for the same.

2. Description of Prior Art

The virtual private network (VPN) is developed to provide a dedicated channel between a remote computer and a local server through a wide area network such as Internet. The VPN also provides measure to ensure the security of communication, just like the trusted internal network (Intranet).

More particularly, VPN provides following measures to ensure security:

1. User authentication: VPN has rigorous authentication upon user and allow the log in for authenticated user only.
2. Address administration: VPN provides dedicated address for authenticated user with ensured security.
3. Data encryption: The data transmitted through Internet is encrypted to prevent from peeping by unauthenticated user.
4. Key management: VPN generates and frequently updates the key between user computer and server.
5. Protocol compatibility: VPN supports popular Internet protocols such as Point-to-Point Tunneling Protocol (PPTP), Layer2 Tunneling Protocol (L2TP) and IPsec.

Internet protocol (IP) is the most popular communication protocol for computer network. However, IP does not take security issue into account and therefore the IPsec protocol is defined by Internet Engineering Task Force (IETF) in Request for Comments (RFC) 2401. The IPsec protocol is used to encrypt the IP data flow and prevent data from modifying and inspection by third party and prevent data from simulation, fetching and playback.

Considering mobility for VPN users, Mobile IPv4 (IETF RFC 3344) is adopted in mobile VPN architecture. However, there are some technical issues needed to be resolved when incorporating Mobile IP (MIP) into IPsec-based VPN gateway.

When a mobile node (MN), such as a notebook computer with wireless communication equipment, roams in an Intranet, a Mobile IP (MIP) is assigned to the MN by a Home Agent (HA). When the MN moves out of Intranet, i.e. roams in an external network such as Internet, it must establish the IPsec tunnel with an IPsec-based VPN gateway before registering with the Home Agent (HA).

During movement, the MN would get a new care-of address (CoA) from the external network. It requires the VPN gateway refresh IPsec tunnel endpoints after MN's each movement into a new IP subnet. However, all packets including MIP messages are encrypted by IPsec protocol. Therefore, FA cannot decrypt MIP messages. Thus, FA is unable to relay MIP messages.

In order to overcome these problems, the IETF MIP4 Working Group (WG) is proposing a mechanism to support international seamless roaming (ISR) for VPN users.

In above-motioned mechanism, there are two HAs for internal and external networks respectively. Namely, an internal HA (i-HA) is provided for MN's mobility management inside Intranet, and an external HA (x-HA) is provided for the MN's mobility management in the external network when the MN moves out of Intranet and roams in the external network.

The x-HA is augmented to encapsulate the IPsec tunnel with the x-MIP tunnel. Therefore, the IPsec tunnel will not break when MN gets a new CoA. The FA will also be able to understand the MIP messages. By the IETF solution, there is no modification to Mobile IPv4 and IPsec standards. Only some changes are necessary for MN.

FIG. 1 is a schematic diagram of mobile VPN architecture defined by IETF. In this figure, an MN 1 roams in Intranet 10 through an i-HA 11. The MN 1 requires registering to an x-HA 21 for obtaining a new CoA when the MN moves from Intranet 10 to Internet 20. Afterward the MN 1 then uses its external home address (x-HoA) to build an IPsec channel with the home VPN gateway 22 through Internet Key Exchange (IKE). The VPN-TIA (VPN Tunnel Inner Address) is also assigned after IKE negotiation accomplishes. Lasting, the MN 1 then registers the VPN-TIA to the i-HA 11 as its internal co-located CoA. These i-MIP registration messages will be encrypted by IPsec ESP (Encapsulating Security Payload) between MN and the VPN gateway. Therefore, the VPN for MN is established when roaming in Intranet 10 and Internet 20.

FIG. 2 shows the message structure of the mobile VPN as MN moves from Intranet 10 to Internet 20. The message contains an original packet 31, an i-MIP channel message 32 encapsulating the original packet 31 and used for the i-HA 11 and the VPN gateway 22, an IPsec channel massage 33 encapsulating the i-MIP channel message 32 and used for the VPN gateway 22 and the x-HA 21, and an x-MIP channel massage 34 encapsulating the IPsec channel massage 33 and used for the x-HA 21 and MN 1.

The solution, however, leads to two questions: where should we put the x-HA and how should we trust the x-HA?

In conventional approach of IETF, a static x-HA 21 is provided in Internet 20. The placement of x-HA will impact the handoff latency between the FA and the x-HA 21 and end-to-end latency when the Internet 20 has a plurality of subnets. In addition, the x-HA is outside VPN and might not be under the control of the VPN. Therefore, there should be a trusted mechanism to assign the x-HA.

The present invention is intended to assign the x-HA dynamically so the handoff latency and end-to-end latency could be minimized. Moreover, AAA (Authentication, Authorization and Accounting) technique is also adopted so that the x-HA can be associated with the VPN securely.

SUMMARY OF THE INVENTION

It is an object to provide an apparatus of dynamically assigning external home agent (x-HA) for mobile Virtual Private Networks (VPNs) and method for the same. The external HA closest to the MN in the visited external network is selected for mobility management of the MN. The MN only need to register with the same external HA when roaming in the same external network. The handoff latency and end-to-end latency for a roaming MN, therefore, could be reduced significantly. It will also not reestablish the IPsec tunnel within the same external network.

To achieve the object, the present invention provides a method of dynamically assigning external home agent (x-HA) for mobile Virtual Private Networks (VPNs). The method establishes VPN between at least one external network and an internal network and enabling at least mobile node (MN) roam in the external networks with security. A DHCP server allocates an IP address to the MN and the MN sending a Registration Request (Reg-Req) message to an external home agent (x-HA) when the MN roams to the external network for the first time.

The x-HA then issues an AA-Mobile-Node-Request (AMR) message to a foreign AAA (AAAF) server. The AAAF server fills the Network Access Identifier (NAI) of the x-HA in AMR message and sends the AMR message to the home AAA (AAAH) server. The AAAH server establishes a security association (SA) between the x-HA and the MN and generates a Home-Agent-MIP-Request (HAR) message for sending to the x-HA. The x-HA allocates an external home address (x-HoA) for the MN and fills the x-HoA and its address in the Home-Agent-MIP-Answer (HAA) message. The x-HA then sends the HAA message to the AAAH server. The AAAH sever uses the pre-configured VPN-TIA as the internal CoA of the MN for registration to the i-HA, and the i-HA authorizes the AAAH server to send an AA-Mobile-Node-Answer (AMA) message to the x-HA. The x-HA obtains a Reg-Reply message from the AMA message and containing the x-HoA and HA addresses; and relays the Reg-Reply message to the MN. When the MN roams in the authorized external network, the MN uses the x-HoA for registration to the assigned x-HA.

To achieve the object, the present invention provides an apparatus of dynamically assigning external home agent (x-HA) for mobile Virtual Private Networks (VPNs). The method establishes VPN between at least one external network and an internal network and enabling at least mobile node (MN) roam in the external networks with security.

The apparatus of dynamically assigning x-HA comprises an internal home agent (i-HA), at least one external home agent (x-HA), a VPN gateway, at least one agent assigner (AAA servers), and at least one DHCP server. The i-HA is arranged in the internal network and manages a roaming registration for the MN when roaming in the internal network. The x-HA is arranged in the external network and manages a roaming registration for the MN when roaming in the external network. The VPN gateway establishes an IPsec channel between the internal network and the x-HA to ensure a secure connection of the MN to the internal network when the MN roams in the external network. The a gent assigner (AAA servers) is used for dynamically and securely assigning a reliable x-HA close to authenticated and authorized the MN for managing the roaming registration for the MN. The DHCP server automatically allocates an IP address as CoA for the MN for managing a roaming registration of the MN with respect to the x-HA, the agent assigner and the i-HA when the MN roams to the external network for the first time. The assigned x-HA relays the IPsec channel between the MN and the VPN gateway, whereby the MN registers to a closest x-HA when roaming in the external network.

The above summaries are intended to illustrate exemplary embodiments of the invention, which will be best understood in conjunction with the detailed description to follow, and are not intended to limit the scope of the appended claims.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1:
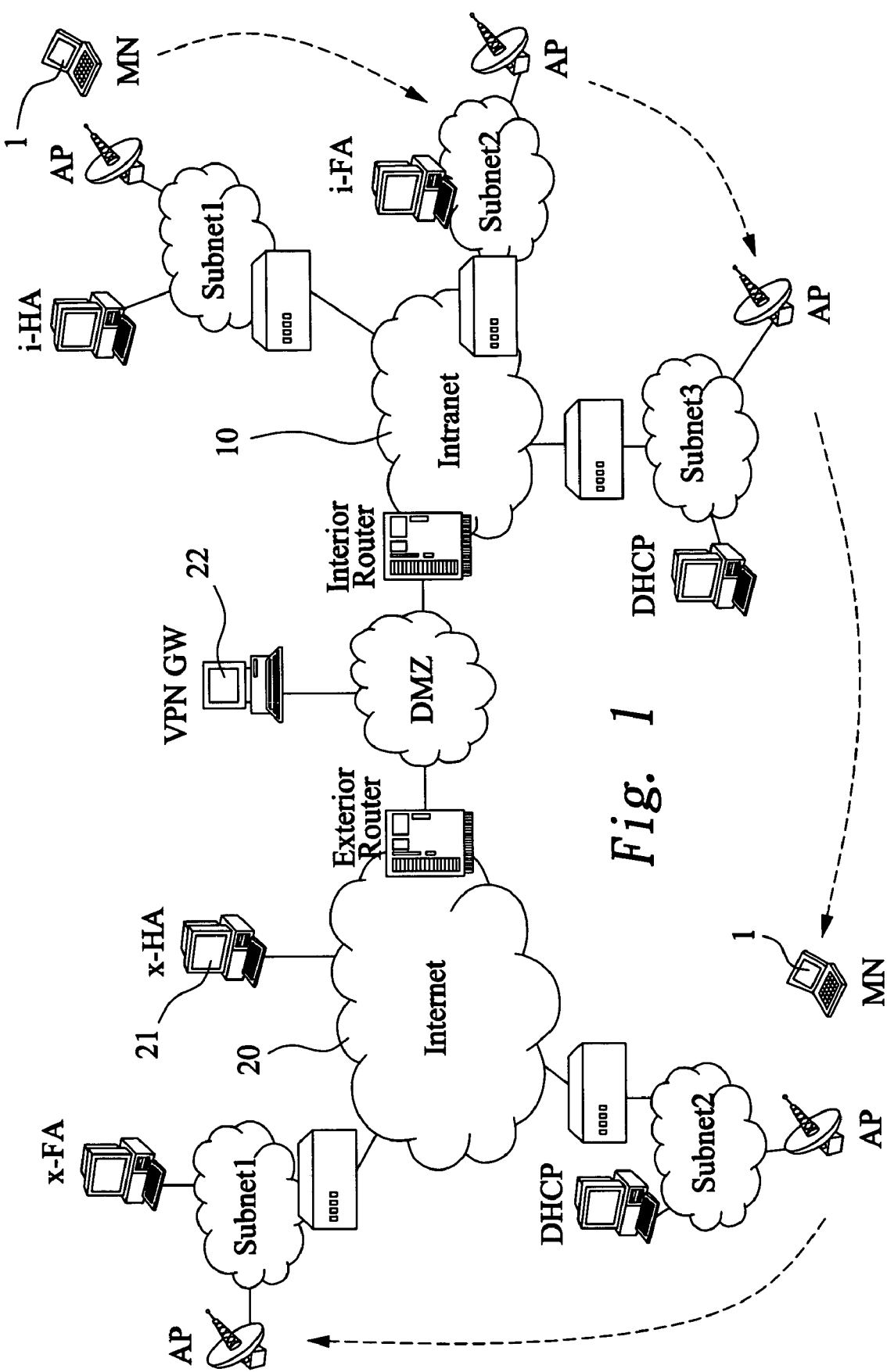
FIG. 1 is a schematic diagram of mobile VPN architecture defined by IETF.
Figure 2:
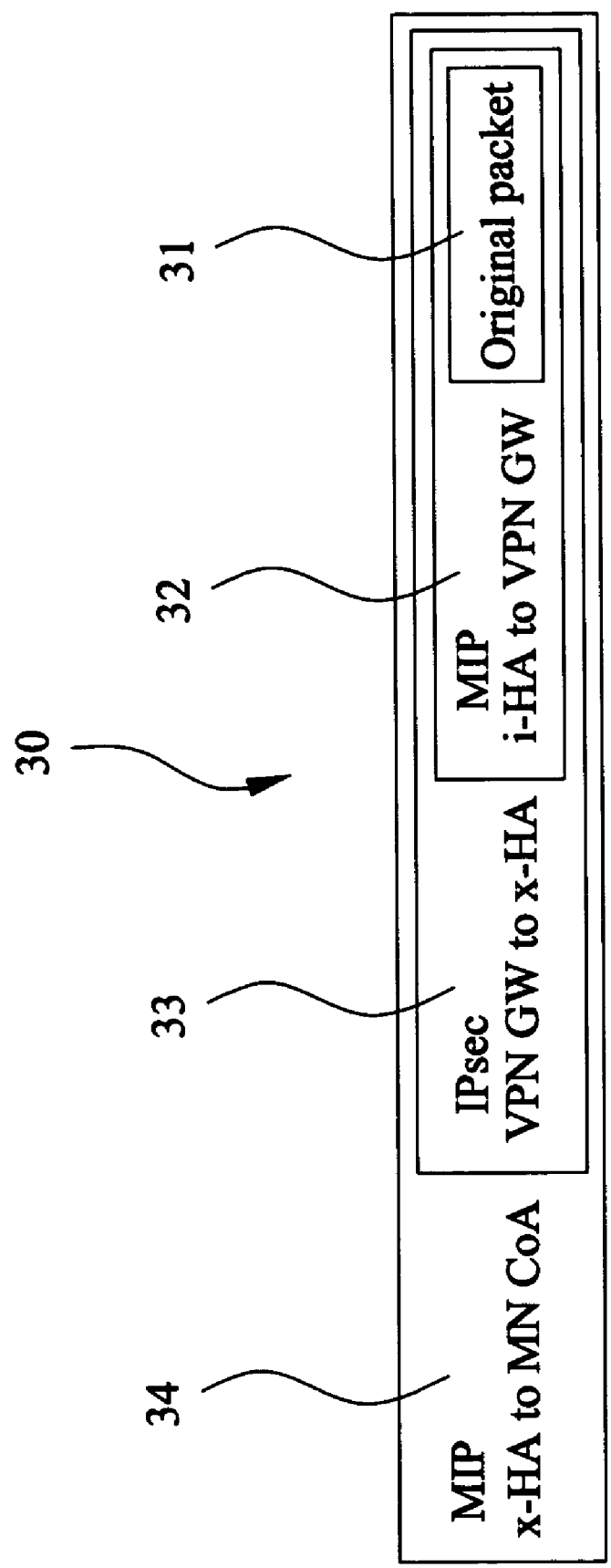
FIG. 2 shows the message structure of the mobile VPN as MN moves from Intranet to Internet.
Figure 3:
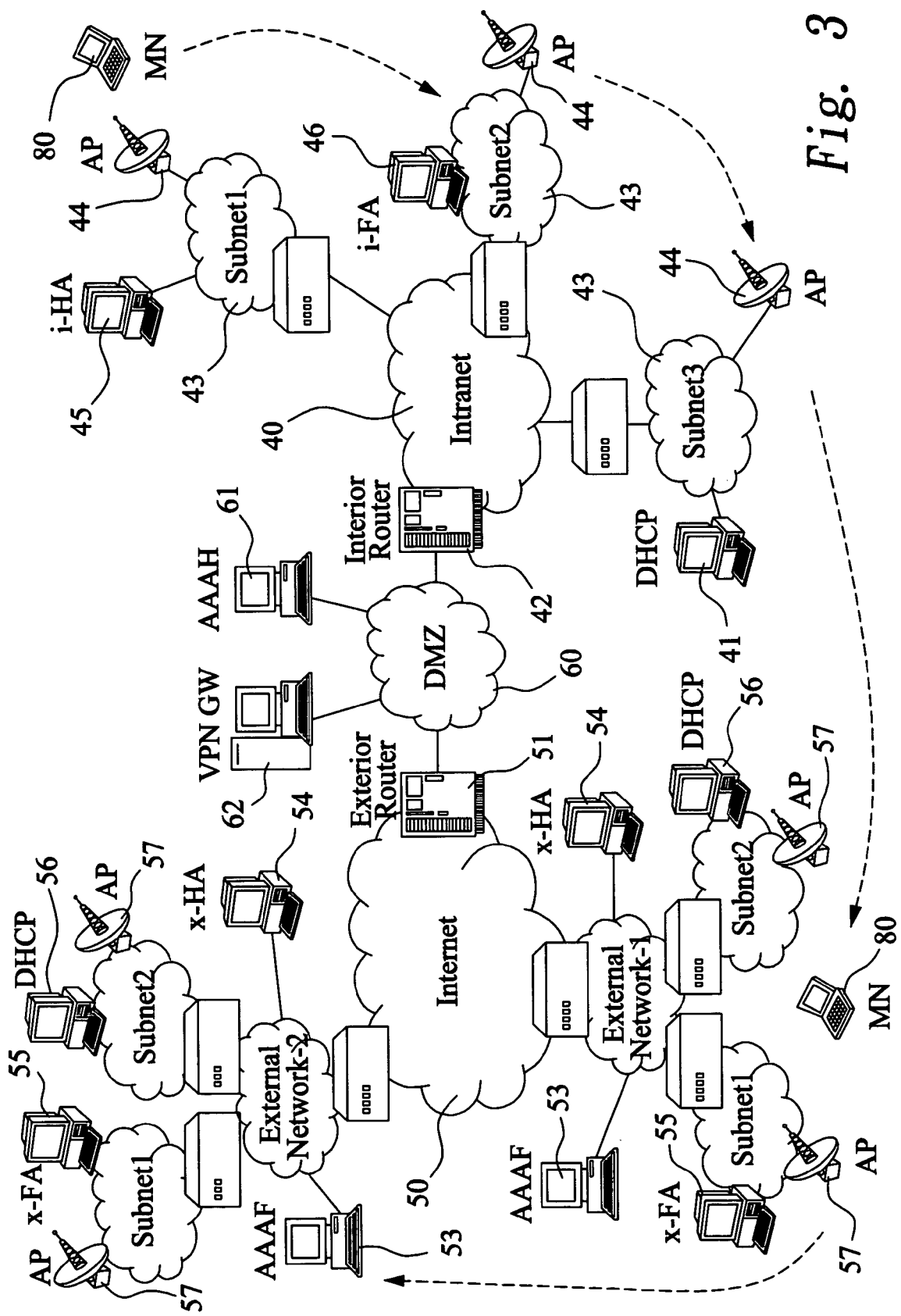
FIG. 3 depicts the network topology for mobile VPN with dynamic x-HA assignment according to the present invention.

FIG. 3 depicts the network topology for mobile VPN with dynamic x-HA assignment according to the present invention. An HA located in Internet and closest to the MN 80 is assigned as the x-HA 54 for the MN. The MN 80 can register to the x-HA 54 for establishing IPsec channel for the mobile VPN.

The x-HA in visited domain (public Internet network) can be dynamically allocated by using DHCP server, AAA (Authentication, Authorization and Accounting) server, DNS server, etc. An optimal HA is chosen for MN in geographical distant locations. Because the x-HA 54 is assigned closely to the MN 80, the latency between the x-HA 54 and MN 80 could be drastically reduced. Besides, the inter-subnet handoff will be faster. Moreover, the load among a group of HAs could also be balanced by administrative policies.

The x-HA must be authenticated and authorized before it is assigned to the MN. Therefore, the AAA server should be adopted to assign the x-HA 54. The present invention employs the Diameter (IETF RFC 3588) as an AAA server. By using Diameter Mobile IPv4 application, the Diameter can not only assign x-HA for MN in foreign administrative domain, but also serve as the key distribution center (KDC) to establish the security association (SA) dynamically between mobility agents, including MN.

FIG. 3 shows an Intranet 40 and at least one public Internet network 50. The Intranet 40 is a protected private network and is connected to a DHCP server 41 and an interior router 42. The interior router 42 is connected to Internet through a DMZ (demilitarized zone), which is connected to home AAA server (AAAH) 61, a VPN gateway 62 and an exterior router 51. The exterior router 51 is connected to the public Internet network 50. The DMZ is a physical region behind Internet and in front of a second firewall for protecting back-end system and data.

The Intranet 40 comprises a plurality of subnets 43, each connected to at least one wireless access point (WAP) 44 for wireless linking to at least one MN 80. The Intranet 40 further comprises an i-HA 45 and an internal foreign agent (i-FA) 46. As shown in FIG. 3, the i-HA 45 is connected to the first subnet 1, the internal foreign agent (i-FA) 46 is connected to the second subnet 2, and the DHCP server 41 is connected to the third subnet 3.

Figure 4:
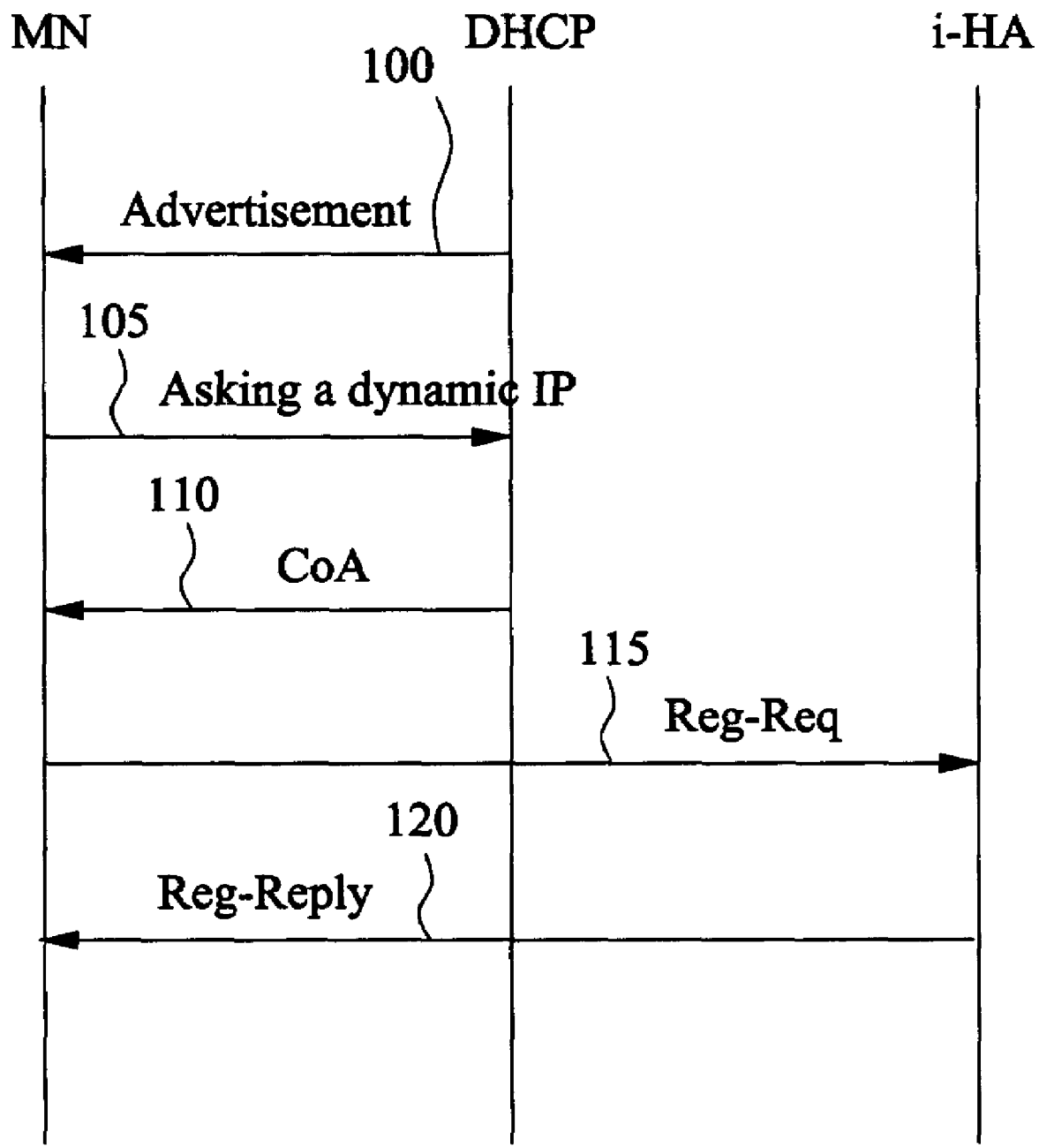
FIG. 4 is registration message flow of MN in Intranet.
Figure 5:
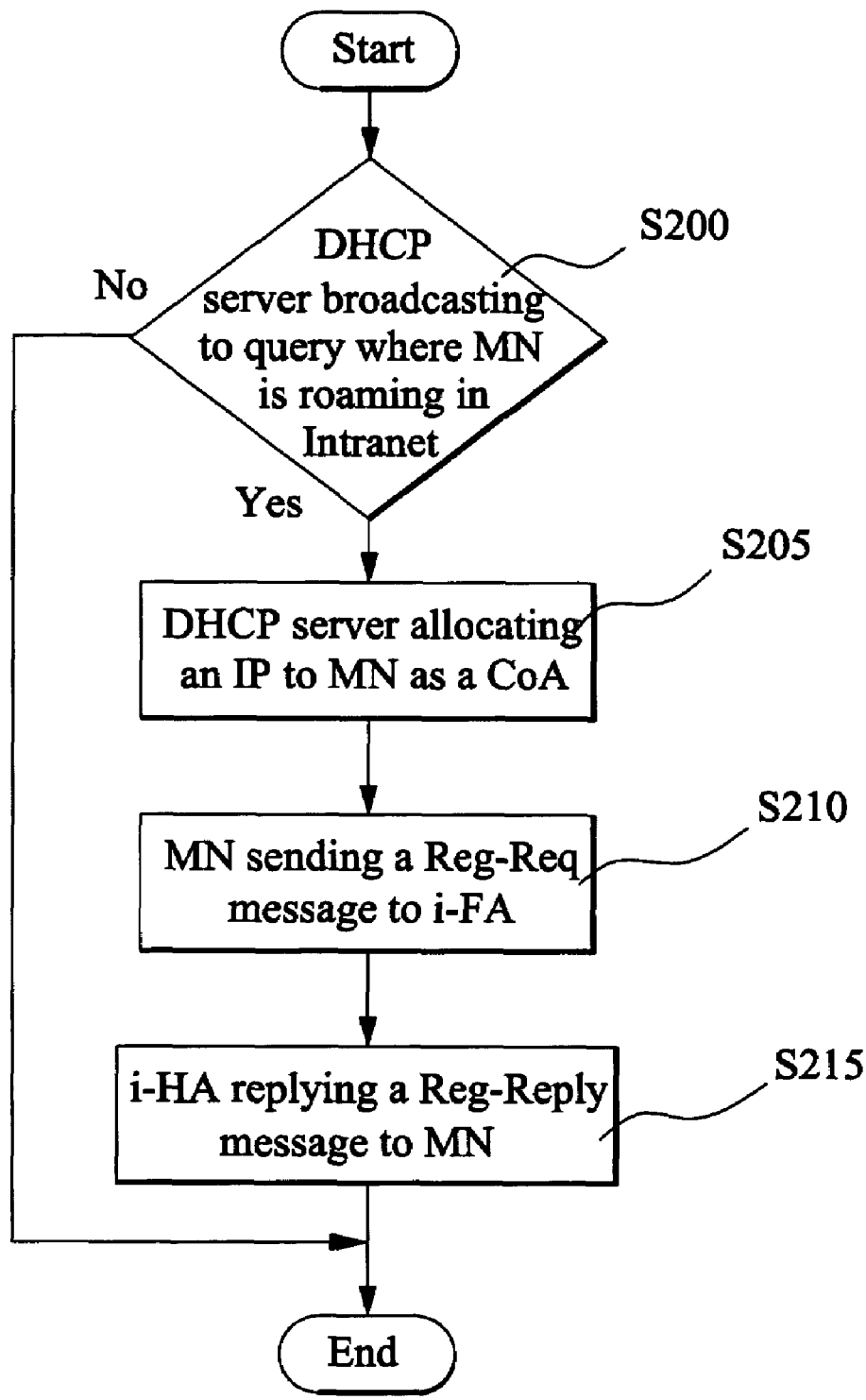
FIG. 5 is a registration flowchart of MN roaming in Intranet.

FIG. 4 is registration message flow of MN 80 in Intranet 40 and FIG. 5 is a registration flowchart of MN 80 roaming in Intranet 40. The DHCP server 41 is functioned to dynamically allocate IP address to each computer in network thereof, and the DHCP server 41 will continue sending Advertisement & Challenge message 100 to detect whether a new computer is plugged to the network at step S200.

When the MN 80 is operated in inter-realm seamless roaming mode, namely, roaming from the second subnet 2 to the third subnet 3, the DHCP server 41 finds the MN 80 and then the MN 80 sends an IP address request message 105 to the DHCP server 41. Afterward, the DHCP server 41 allocates a new dynamic IP address 110 to the MN 80 at step S205.

The MN 80 uses the new dynamic IP address as CoA and sends a Registration Request (Reg-Req) message 115 to the i-HA 45 at step S210. The i-HA 45 can identify the MN 80 and authorize the registration for the MN 80. The i-HA 45 sends a Reg-Reply message 120 to the MN 80 at step S215 to complete the registration procedure for intra-realm roaming.

With reference now to FIG. 3, the Internet 50 is an unprotected public network and composed of a plurality of external networks, such as a first external network and a second external network. Each of the external networks comprises a plurality of subnets and connected to a foreign AAA server (AAAF) 53, an x-HA 54, an external foreign agent (x-FA) 55, a DHCP server 56 and at least one WAP 57.

Figure 6:
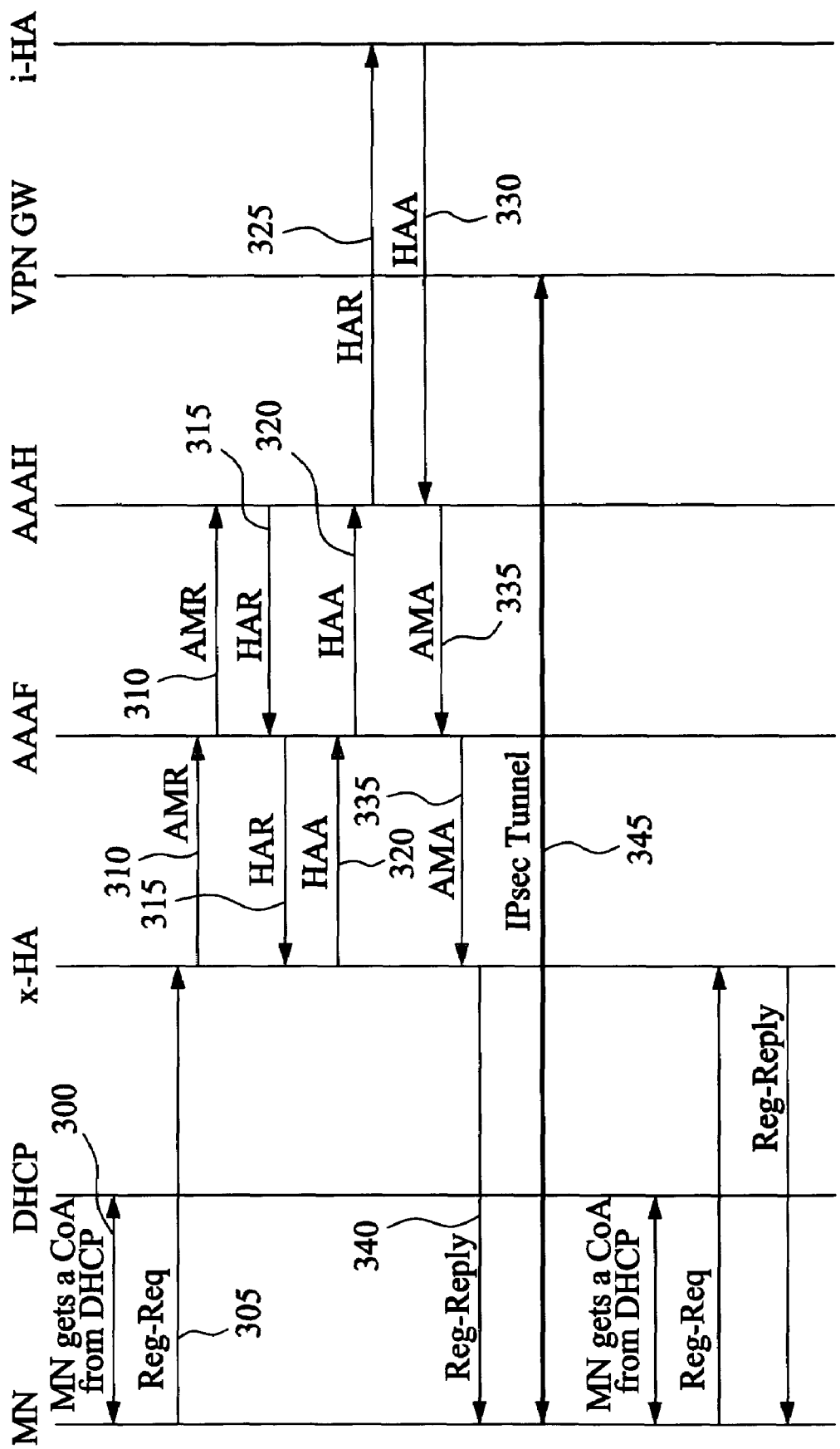
FIG. 6 is registration message flow of MN in Internet.
Figure 7A:
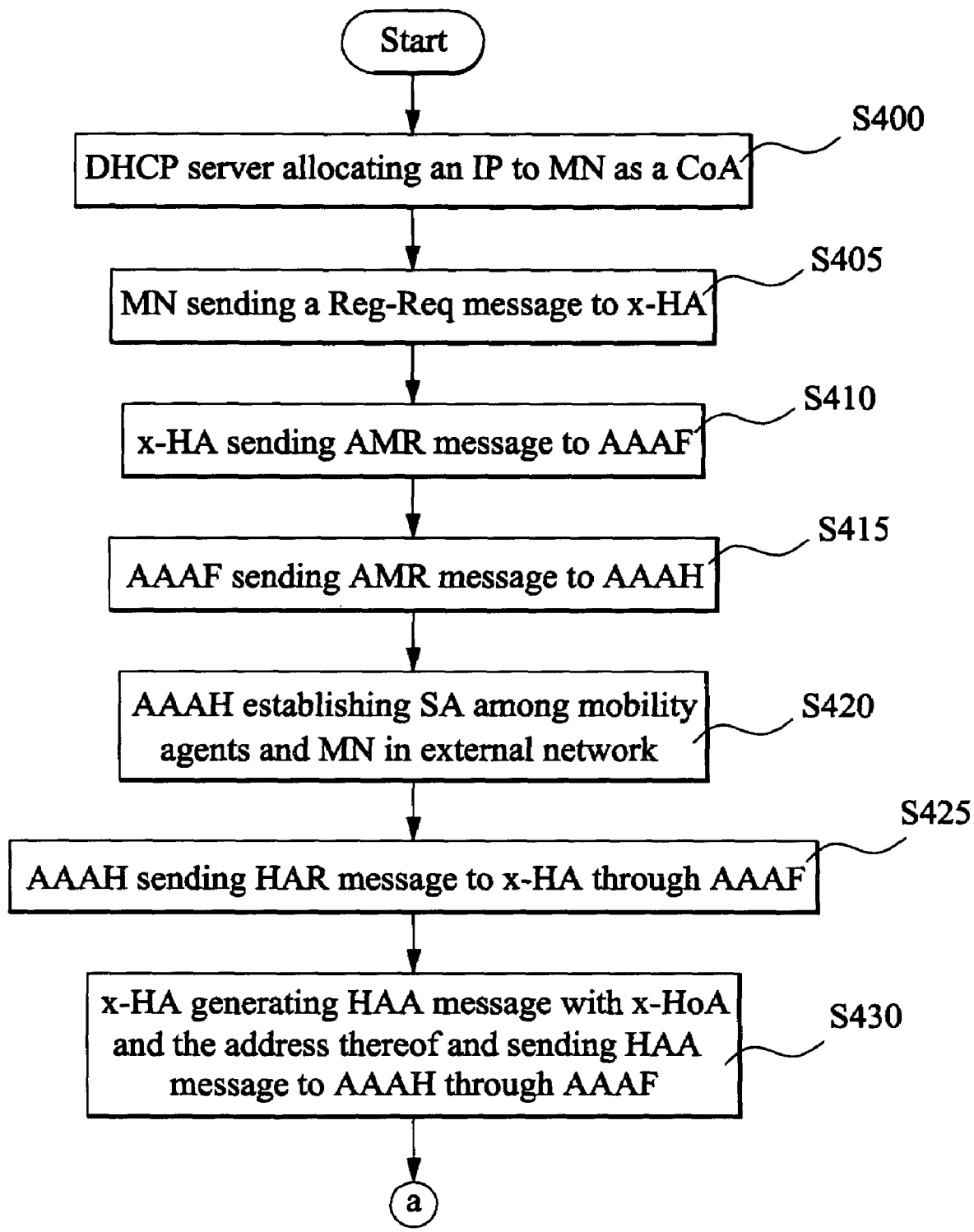
FIGS. 7A and 7B show registration flowchart of MN roaming in Internet.
Figure 7B:
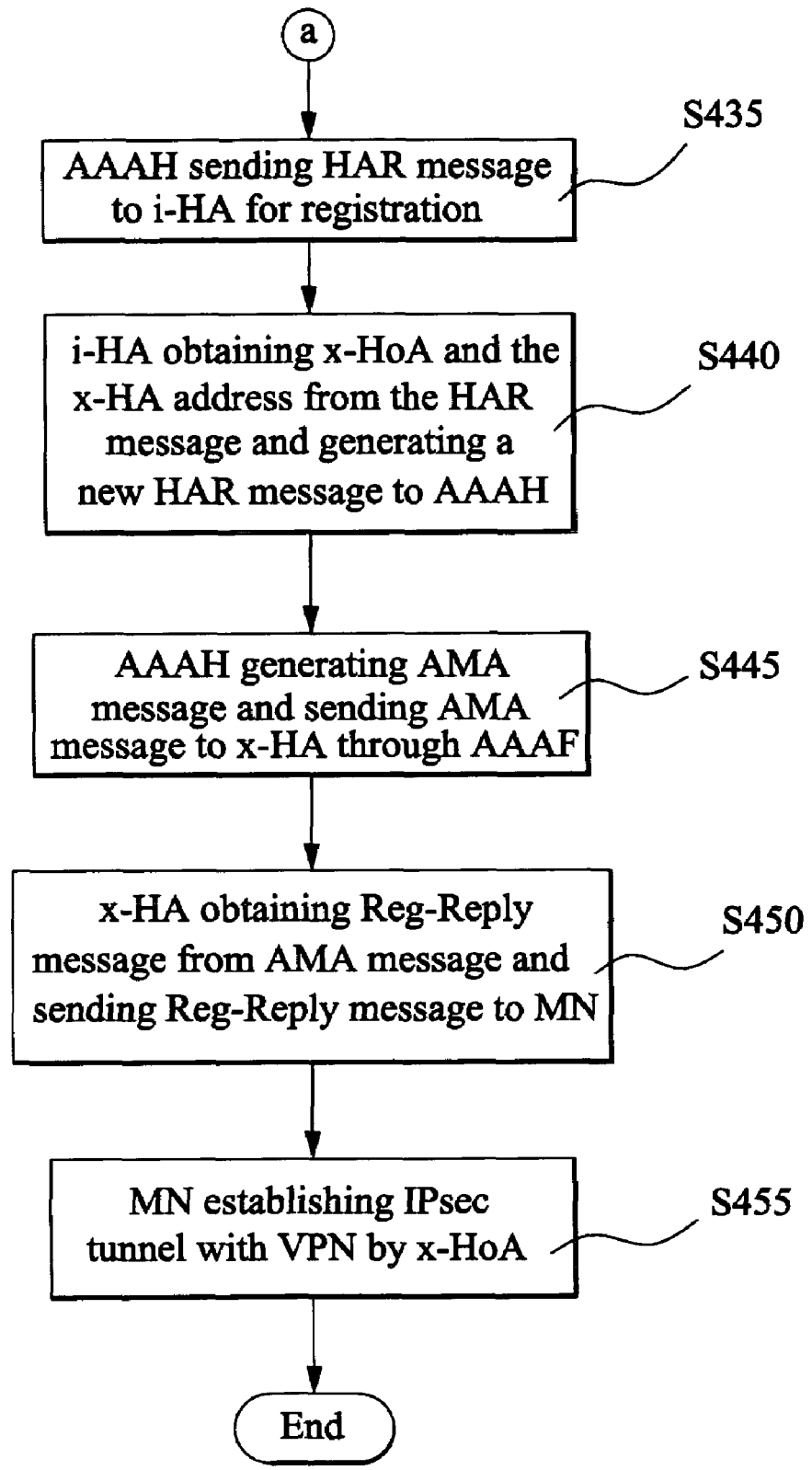

With reference now to FIGS. 6, 7A and 7B, the registration flowchart and message flow for MN 80 roaming in Internet 50 are shown. When the MN 80 roams into the external network from the Intranet, the DHCP server 56 automatically allocates a new dynamic IP address to the MN 80 at step S400.

The MN 80 uses the new dynamic IP address as CoA 300 and sends a Registration Request (Reg-Req) message 305 to the x-HA 54 at step S405.

The Reg-Req message 305 comprises fields including a home address (HoA), an HA address, an authentication information for AAAH 61 and an MN's Network Access Identifier (NAI) etc.

In the Reg-Req message 305 received by the x-HA 54, the addresses of HoA and HA address should be set as 0.0.0.0 to manifest that the MN 80 intends to get an External Home Address (x-HoA) from the Internet and to know the address of the x-HA. The x-HA 54 then generates an MIP-Feature-Vector AVP (Attribute Value Pair) with setting the flags of Mobile-Node Home-Address-Requested and Home-Agent-Requested.

At this time, the x-HA 54 encapulates the MIP-Feature-Vector AVP and other required AVPs into an AA-Mobile-Node-Request (AMR) message 310. The AMR message 310 is then sent to the AAAF 53 at step S410.

The AAAF 53 will check whether the Home-Agent-Requested flag in the MIP-Feature-Vector AVP is one.

If the Home-Agent-Requested flag is one, the AAAF 53 asks the AAAH 61 to assign an x-HA 54 in the foreign network as the HA of the MN 80 by setting the Foreign-Home-Agent-Available flag to one in the MIP-Feature-Vector AVP and fills the candidate x-HA's NAI in the MIP-Candidate-Home-Agent-Host AVP. At last, the AAAF 53 forwards the AMR 310 to the AAAH 61 at step S415.

Upon receiving the AMR 310 from AAAF 53, the AAAH 61 must authenticate the MN 80 first by the MIP-Reg-Req and MIP-MN-AAA-Auth AVPs 305. The AAAH 61 determines a security policy for the MN 80 (such as cryptographic algorithm or longterm shared key) by the MN-AAA-SPI (Security Parameters Index) AVP in the grouped MIP-MN-AAA-Auth AVP 310.

If the authentication is successful, the AAAH 61 will check whether Home-Agent-Requested and Foreign-Home-Agent-Available bits are set to one in the MIP-Feature-Vector AVP of the AMR message 310. If true, the dynamic x-HA assignment in visited realm is requested. At step S420, the AAAH 61 then establishes the SA between MN 80 and x-HA 54 in the external network.

The AAAH 61 generating random numbers at least 128 bits known as key materials (also called nonces) to derive requested session keys for setting up the SAs.

The MIP-Feature-Vector AVPs in the AMR message 310 issued by the x-HA 54 and the AAAF 53 also include a plurality of Key-Requests. The Key-Requests include MN-HA-Key-Requested for the MN 80 and the x-HA 54.

Via the Diameter protocol, the derived session keys can be securely transmitted to x-HA 54. This is because the IPsec or Transport Layer Security (TLS, IETF RFC 2246) is mandatory to apply on protecting communication data between Diameter nodes (including servers, clients and agents). On the other hand, the nonces are instead propagated to the MN 80 because the session keys will be exposed through unprotected Mobile IP protocol.

Afterwards, the AAAH 61 issues the Home-Agent-MIP-Request (HAR) message 315 encapsulated with the nonce, session key and Reg-Req message to the candidate x-HA through the proxy AAAF 53 at step S425. Therefore, the x-HA 54 can get the nonce for the MN 80 and the x-HA 54 from the AVPs in the HAR message 315.

If MIP-Mobile-Node-Address AVP is absent in the received HAR message 315 for the x-HA 54 and Mobile-Node-Home-Address-Requested flag is set to one in the MIP-Feature-Vector AVP, the x-HA 54 will allocate an external home address (x-HoA) for the MN 80 within the MIP-Mobile-Node-Address AVP. Moreover, the x-HA 54 fills its address thereof in the MIP-Home-Agent-Address AVP if Home-Agent-Requested flag is equal to one.

The x-HA 54 then saves the MN-xHA session key and copies the nonce to the Registration Reply (Reg-Reply) message. The x-HA 54 then generates a Home-Agent-MIP-Answer (HAA) message 320 and sends the HAA message 320 to the AAAH 61 through the AAAF 53 at step S430. The HAA 320 comprises necessary AVPs like MIP-Reg-Reply AVP, Result-Code AVP, MIP-Mobile-Node-Address AVP with the x-HoA of the MN 80 and an MIP-Home-Agent-Address AVP with x-HA 54 address.

After the AAAH 61 receives the HAA message 320 sent by the x-HA 54 through the AAAF 53, the AAAH 61 obtains the x-HoA of MN 80 from the MIP-Mobile-Node-Address AVP, and obtains the address of the x-HA 54 from the MIP-Home-Agent-Address AVP.

Afterward, the AAAH 61 establishes a new HAR message 325 and fills the i-HoA and VPN-TIA into the MIP-Mobile-Node-Address AVP and our defined VPN-Tunnel-Inner-Address AVP, respectively. The AAAH 61 then issues the HAR message 325 to the i-HA 45 for registration in step S435.

When the i-HA 45 receives the HAR message 325, the i-HA 45 acquires the VPN-TIA from the AVP of the HAR message 325 and registers the VPN-TIA as the MN's internal Co-located CoA. Afterward, a new HAA message 330 is then constructed by the i-HA to acknowledge the HAR 325 and sent to the AAAH 61 at step S440.

On receipt of both the HAA messages 330 from i-HA with Result-Code AVP indicating success, the AAAH 61 creates the AA-Mobile-Node-Answer (AMA) message 335 with DIAMETER_SUCCESS Result-Code and the necessary AVPs (including the MIP-Home-Agent-Address, MIP-Mobile-Node-Address and MIP-Reg-Reply) are copied from the received HAA message 330. The AMA message 335 is sent to the x-HA 55 through the proxy AAAF 53 at step S445.

When the x-HA 54 receives the AMA message 335 with Result-Code AVP indicating success from the AAAH 61, it obtains the Reg-Reply message 340 from the MIP-Reg-Reply AVP in the received AMA message 335 and forwards it to the MN 80 at step S450. Otherwise, the x-HA 54 will silently discard this AMA message 335.

Once the MN 80 receives the Reg-Reply message 340, the MN 80 gets its new x-HoA, x-HA address and nonces. The MN 80 then calculates the correct session keys with the received nonces and longterm shared key by the same hashing algorithm as the AAAH 61 used.

Through the session keys, the MN 80 can directly establish Mobile IPv4 registration to the x-HA 54 without involving AAA infrastructure. The MN 80 can connect to the VPN gateway through x-HoA. Finally, the MN 80 sets up IPsec tunnel 345 with the VPN gateway through IKE negotiation at step S455 and resumes the previous safe communication as in internal network.

After completion of the x-HA 54 assignment, the SA between HAs is established. Thus, the MN 80 can directly communicate with the x-HA 54 as defined in MIPv4 standard without involving the Diameter infrastructure (AAA server). Furthermore, the MN 80 only needs to register with the assigned x-HA 54 when getting a new CoA in the foreign network. There is no need to register with the i-HA 45. It will also not reestablish the IPsec tunnel within the same external network.

However, the session keys possess a lifetime. If the lifetime expires, the Diameter infrastructure (AAA server) must be invoked again to acquire new session keys. Besides, if the MN 80 moves into another foreign network and wants to request a new x-HA at local, the whole process discussed above will be executed. The x-HA will be reassigned. The IPsec tunnel is reestablished.

To sum up, the present invention replaces the static x-HA with dynamic x-HA. The handoff latency and end-to-end latency for a roaming MN, therefore, could be reduced significantly. Besides, the present invention leverages Diameter MIPv4 application to establish security associations between mobility agents. Thus, the x-HA could be trusted. In addition, the registrations with x-HA and i-HA are concurrently accomplished.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A method of dynamically assigning external home agent (x-HA) for mobile Virtual Private Networks (VPNs), the method establishing VPN between at least one external network and an internal network and enabling at least one mobile node (MN) to roam in the external networks with security, the method comprising the steps of:
   a Dynamic Host Configuration Protocol (DHCP) server allocating a Care Of Address (CoA) to the MN and the MN sending a Registration Request (Reg-Req) message to an external home agent (x-HA) when the MN roams to the external network for the first time, wherein the Reg-Req message comprises fields including a home address (HoA) request, and a home agent (HA) address request;
   the x-HA sending an AA-Mobile-Node-Request (AMR) message to a foreign authentication, authorization and accounting (AAAF) server, the AAAF server filling the Network Access Identifier (NAI) of a candidate x-HA in AMR message and sending the AMR message to a home authentication, authorization and accounting (AAAH) server acting as an agent assignor;
   the AAAH server establishing security associations (SAs) among the candidate x-HA and the MN and generating a Home-Agent-Mobile Internet Protocol Request (Home-Agent-MIP-Request) (HAR) message for sending to the x-HA;
   the x-HA allocating an external home address (x-HoA) for the MN and filling the x-HoA and its x-HA address thereof in the Home-Agent-MIP-Answer (HAA) message, the x-HA then sending the HAA message to the AAAH server;
   the AANH server using a pre-configured Virtual Private Network-Tunnel Inner Address (VPN-TIA) as an internal CoA of the MN for registration to an internal-Home Agent (i-HA), the i-HA authorizing the AAAH server to send an AA-Mobile-Node-Answer (AMA) message to the x-HA; and
   the x-HA obtaining a Reg-Reply message sent from the AMA message and containing the allocated x-HoA and the x-HA address, and then sending the Reg-Reply message to the MN;
   when the MN roams in the external network, the MN uses the x-HoA for registration to the assigned x-HA with the x-HA address.

2. The method of dynamically assigning external home agent as in claim 1, wherein the MN is a notebook computer with wireless network equipment.

3. The method of dynamically assigning external home agent as in claim 1, further comprising the step before the MN roams in the external network for the first time:
   the DHCP server broadcasting an Advertisement & Challenge message to the external network for asking whether any MN is roaming in the external network and allocating a dynamic Internet Protocol (IP) address if a roaming MN is found; and
   the MN using the dynamic IP address as CoA for sending the Reg-Req message.

4. The method of dynamically assigning external home agent as in claim 1, wherein the Reg-Req message comprises an authentication information for AAAH and the Network Access Identifier (NAI) for the MN.

5. The method of dynamically assigning external home agent as in claim 1, further comprising the steps after the MN roams the external network for the first time:
   upon receiving Reg-Req message, the x-HA generating an MIP-Feature-Vector Attribute Value Pair (AVP) enabling MN Home-Address-Request and Home-Agent-Request flags; and
   setting the MIP-Feature-Vector AVP to the Reg-Req message.

6. The method of dynamically assigning external home agent as in claim 1, further comprising a step after the x-HA sending the AMR message;
   the AAAH server receiving the AMR message through the AAAF server and knowing a security policy of the MN through an MIP-MN-AAA-SPI (Security Parameters Index) in the AMR message.

7. The method of dynamically assigning external home agent as in claim 1, further comprising sub-steps in the step that the AAAH server establishes security associations (SA):
   the AAAH server generating random numbers at least 128 bits functioning as key materials, the key materials being used to derive requested session keys for setting up SAs; and
   encapsulating the session keys to the HAR message.

8. The method of dynamically assigning external home agent as in claim 1, wherein in the step that the AAAH server establishes SA, the HAR message is sent to the x-HA through the AAAF server.

9. The method of dynamically assigning external home agent as in claim 1, wherein in the step that the AAAH server establishes SA, the HAR message comprises Mobile Internet Protocol-Mobile Node-to-Home Agent-Key (MIP-MN-to-HA-Key) containing an MN-xHA nonce.

10. The method of dynamically assigning external home agent as in claim 1, wherein in the step of the x-HA allocating an x-HoA for the MN, the HAA message is sent to the AAAH server through the AAAF server.

11. The method of dynamically assigning external home agent as in claim 1, further comprising a sub-step in the step of sending the Reg-Reply message to the MN:

the MN connecting to a VPN gateway by using the x-HoA such that an Internet Protocol Security (IPsec) channel is established between the MN and the VPN gateway.

* * * * *